United States Patent [19]

Harris

[11] Patent Number: 5,506,492
[45] Date of Patent: Apr. 9, 1996

[54] HIGH OUTPUT ALTERNATOR AND REGULATOR

[76] Inventor: Ronald R. Harris, P.O. Box 161037, Fort Worth, Tex. 76161-1037

[21] Appl. No.: 157,921

[22] Filed: Nov. 24, 1993

[51] Int. Cl.$^6$ ...................................................... H02P 9/00
[52] U.S. Cl. .................................. 322/28; 322/90; 363/61
[58] Field of Search ................................. 322/4; 290/49

[56] References Cited

U.S. PATENT DOCUMENTS

| | | |
|---|---|---|
| 3,770,976 | 11/1973 | Stroud et al. . |
| 3,809,996 | 5/1974 | Meisenheimer . |
| 3,899,652 | 8/1975 | Terry et al. . |
| 3,984,750 | 10/1976 | Pfeffer et al. . |
| 4,045,718 | 8/1977 | Gray . |
| 4,100,474 | 7/1978 | Pfeffer et al. . |
| 4,141,613 | 2/1979 | Mori et al. . |
| 4,143,280 | 3/1979 | Ruehn, Jr. et al. ........................ 290/9 |
| 4,156,836 | 5/1979 | Wiley . |
| 4,161,683 | 7/1979 | Stroud et al. . |
| 4,161,684 | 7/1979 | Ragály . |
| 4,197,492 | 4/1980 | Sato et al. . |
| 4,214,198 | 7/1980 | Schneider . |
| 4,239,978 | 12/1980 | Kofink . |
| 4,262,242 | 4/1981 | Glennon . |
| 4,314,194 | 2/1982 | Severing . |
| 4,330,715 | 5/1982 | Stroud et al. . |
| 4,336,485 | 6/1982 | Stroud . |
| 4,347,473 | 8/1982 | Stroud . |
| 4,354,127 | 10/1982 | Stroud . |
| 4,356,418 | 10/1982 | Stroud . |
| 4,419,618 | 12/1983 | Gretsch . |
| 4,454,464 | 6/1984 | Stroud . |
| 4,456,870 | 6/1984 | Rodari . |
| 4,599,687 | 7/1986 | Smith . |
| 4,692,684 | 9/1987 | Schaeffer . |
| 4,720,645 | 1/1988 | Stroud . |
| 4,853,557 | 8/1989 | Meier et al. . |
| 4,904,841 | 2/1990 | English . |
| 4,999,563 | 3/1991 | Suzuki . |
| 5,013,991 | 5/1991 | Brune . |
| 5,189,361 | 2/1993 | Meier ......................................... 322/90 |

Primary Examiner—Steven L. Stephan
Assistant Examiner—Nicholas Ponomarenko
Attorney, Agent, or Firm—Felsman, Bradley, Gunter & Dillon

[57] ABSTRACT

A high output alternator and regulator for generating electrical power in a motor vehicle having a storage battery for providing stand-by power at a predetermined voltage. The alternator is a mechanically driven generator having stator windings across which a three-phase AC voltage is produced at an amplitude determined by the amount of current fed through a field winding. A first rectifier is for rectifying the three-phase AC voltage to provide a DC battery voltage to supply other DC voltage loads and a second rectifier rectifies the three-phase AC voltage and inputs into a voltage multiplier circuit which amplifies the rectified voltage. The voltage multiplier circuit inputs the amplified voltage into a voltage regulator having inputs which sense the battery voltage. The voltage regulator outputs the voltage at full or a fractional magnitude of the multiplied DC voltage to control the field current fed through the field winding of the generator to cause a three-phase AC voltage developed across stator windings of the generator to have an amplitude necessary to establish and maintain the DC battery voltage at its predetermined magnitude.

23 Claims, 4 Drawing Sheets

HIGH OUTPUT ALTERNATOR AND REGULATOR

BACKGROUND OF THE INVENTION

1. Field of the Invention

The present invention relates in general to alternators, and in particular to an alternator and regulator system used in a motor vehicle. Still more particularly, the present invention relates to an alternator providing current to large loads in a motor vehicle.

2. Background Information

The typical alternator contains a three-phase AC generator, a three-phase full-wave rectifier, and a voltage regulator. The engine driven alternator as used in the motor vehicle typically includes a battery which provides stand-by power at a DC voltage of a predetermined low magnitude (normally 14 volts) between a main power terminal and system ground. In such service, storage batteries are connected across the load to provide starting power for the engine, and to supply a reserve of power when the alternator output may fall short of the load demand level when the engine is operating at idle. There are stator windings within the three-phase AC generator across which a three-phase AC voltage is produced at an amplitude determined by the amount of current fed through a field winding surrounding a rotor core. The rectifier acts to convert the three-phase AC voltage to a DC voltage between the main power terminal and system ground for charging the battery and for supplying the other DC voltage vehicle loads. The voltage regulator is responsive to the DC voltage appearing between the main power terminal and system ground to control the amount of current fed through the field winding of the generator so as to cause the three-phase AC voltage output by the stator windings of the generator to have an amplitude correct to establish and maintain the DC voltage at the predetermined low magnitude.

Power output of an AC generator is usually effected by controlling the magnitude of the field current to the exciter windings of the generator. The regulator controls the voltage output to the excitation coil, or field winding, according to the effect of the load demands of the connected devices to the system voltage. If the load on the generator increases, causing a drop in the predetermined low magnitude voltage, that condition is detected by a voltage regulator and the field current is increased, causing the output voltage of the alternator to return to the predetermined voltage. Similarly, if the load on the generator is reduced, causing the voltage to increase above the predetermined low magnitude voltage, the magnitude of the field current is reduced, thereby decreasing the output power of the alternator.

The input voltage supplied to the voltage regulator is typically common to the rectified positive output of the stator windings, the load positive connection, and the battery positive terminal. Since all voltage regulators contain components that experience voltage drops across their circuits, the maximum voltage output of the regulator into the field excitation coil is always less than the voltage output of the alternator. The amount of voltage drop varies according to the efficiency of the regulator, varying from 0.8 volts to 2.5 volts.

One common type of motor vehicle having extraordinary power drains on the alternator are emergency vehicles. Often, the tremendous loads created by the multiple lights, radios, monitors, medical equipment, and safety equipment seen on ambulances, fire trucks, and modern police vehicles can create sufficient loads on the generator to significantly drop the voltage seen at the battery terminals. These power drains typically exceed the 160 amps output available from high output commercial alternators currently available. This creates severe power drain on the batteries and large stresses on the alternator. These conditions make the battery and alternator susceptible to failure. This will place the emergency vehicle out of service frequently and may present dangerous problems if such failure occurs while the vehicle is involved in an emergency situation.

This has created a need for a reliable high power output alternator. Although some advances have been made, current high output alternators don't provide sufficient power, are too expensive to make, or are too bulky to implement. Recognizing that enhancing the power output is based on the principle that the output of the three-phase AC generator is directly proportional to the current fed through the excitation coil, much effort is gone into maximizing the voltage applied to the coil and in reducing the resistance of the coil itself. With an optimum system for a self-excited alternator, prior art systems have been limited to the DC output of the alternator as a maximum excitation voltage. Moreover, rotor coil resistance has been reduced to as low as 2 ohms so that further reductions in resistance are also impractical. In most alternator systems, these limitations have been accepted, and the alternator performance has been limited by economically compromising a balance of these alternatives.

A few inventors have recognized that increasing the field excitation voltage beyond the regulated alternator output voltage would greatly improve the output of an alternator. The Schneider patent, U.S. Pat. No. 4,214,198, increases alternator rectified output voltage to 28 volts and thereby increases available rotor excitation voltage and total power output. A step down transformer is then used to reduce the operating system voltage to 14 volts. This system is very bulky and expensive due to the additional transformer.

The Severing patent, U.S. Pat. No. 4,314,194, addresses the increased rotor excitation voltage alternative with a complicated system of multiple stator windings connected in series to separate rectifier networks to increase available voltage to the regulator feeding the field excitation coil, while maintaining regulated system voltage at a lower level. This approach cannot be easily retrofitted to existing systems, and is bulky and expensive to implement in a high-output alternator due to the additional stator coils required. Severing complicates the alternator with dual wound stators which limit the alternator potential by consuming stator core space with windings dedicated to exciting the rotor. This reduces the core space available for output power winding coils.

The Stroud patent, U.S. Pat. No, 4,454,464, addresses the increased rotor excitation voltage alternative with a system which uses capacitors and relay switches to remove the voltage regulator from the circuit under full load, and feed alternator output voltage to the rotor coil without the voltage drop through the regulator. The series action of the capacitors further increases the rotor voltage from 14 volts up to as high as 17 to 20 volts depending upon rpm. In actual use, this system causes severe headlight flicker from the frequent switch-over from regulated field voltage to unregulated enhanced voltage totally dependent upon load to maintain voltage level. This unresolved voltage flicker has caused rejection of these devices by the marketplace.

The present invention provides a cost effective system for significantly increasing regulated rotor excitation voltage. Moreover, additional transformers or additional multiple stator windings are not required, and so, the bulk or complexity of the alternator unit does not have to be increased. The present invention only requires a redesigned voltage regulator and the addition of a voltage multiplier. This makes the high output alternator of the present invention inexpensive to produce, extremely reliable, and easily retrofitted into existing alternators.

SUMMARY OF THE INVENTION

It is therefore one object of the present invention to provide an alternator with improved high output performance.

Another object of the present invention is to provide regulated alternator rotor excitation voltage that is amplified beyond the alternator's output voltage.

A further object of the present invention is to provide an alternator that can be applied to modern alternator systems with a minimum of complexity and conversion expense.

Still another object of the present invention is to provide a field voltage regulator which minimizes the voltage drop through the regulator.

According to the present invention, the foregoing and other objects are attained by a high output alternator and regulator for generating electrical power in a motor vehicle having a storage battery for providing stand-by power at a predetermined voltage. The alternator is a mechanically driven generator having stator windings across which a three-phase AC voltage is produced at an amplitude determined by the amount of current fed through a field winding. A first rectifier is for rectifying the three-phase AC voltage to provide a DC battery voltage for supplying other DC voltage loads, and a second rectifier rectifies the three-phase AC voltage and inputs into a voltage multiplier circuit which amplifies the rectified voltage. The voltage multiplier circuit provides the amplified voltage to a voltage regulator having inputs which sense the battery voltage. The voltage regulator outputs a voltage at full or a fractional magnitude of the multiplied DC voltage to control the field current fed through the field winding of the generator to cause a three-phase AC voltage developed across stator windings of the generator to have an amplitude necessary to establish and maintain the DC battery voltage at its predetermined magnitude.

In accordance with another aspect of the present invention, the voltage regulator is designed having inputs from the battery, and a control circuit connected to the base of a field power transistor. The field winding is powered at one side by a positive voltage source, and the other side is connected to a first terminal of the transistor. A second terminal of the transistor is connected to the return, or negative voltage terminal.

DESCRIPTION OF THE PREFERRED EMBODIMENT

Although the present invention may be used to provide power to power tools or to an arc welder, the inventor's preferred use is within a motor vehicle. In particular, the present invention will be most useful in a motor vehicle having many high-powered loads. The most illustrative example is an ambulance which may require the output alternator of the present invention to simultaneously power emergency lights, a siren, various radio systems, life support equipment, health monitoring equipment, and the general power needs required to operate the motor vehicle itself.

Figure 1:
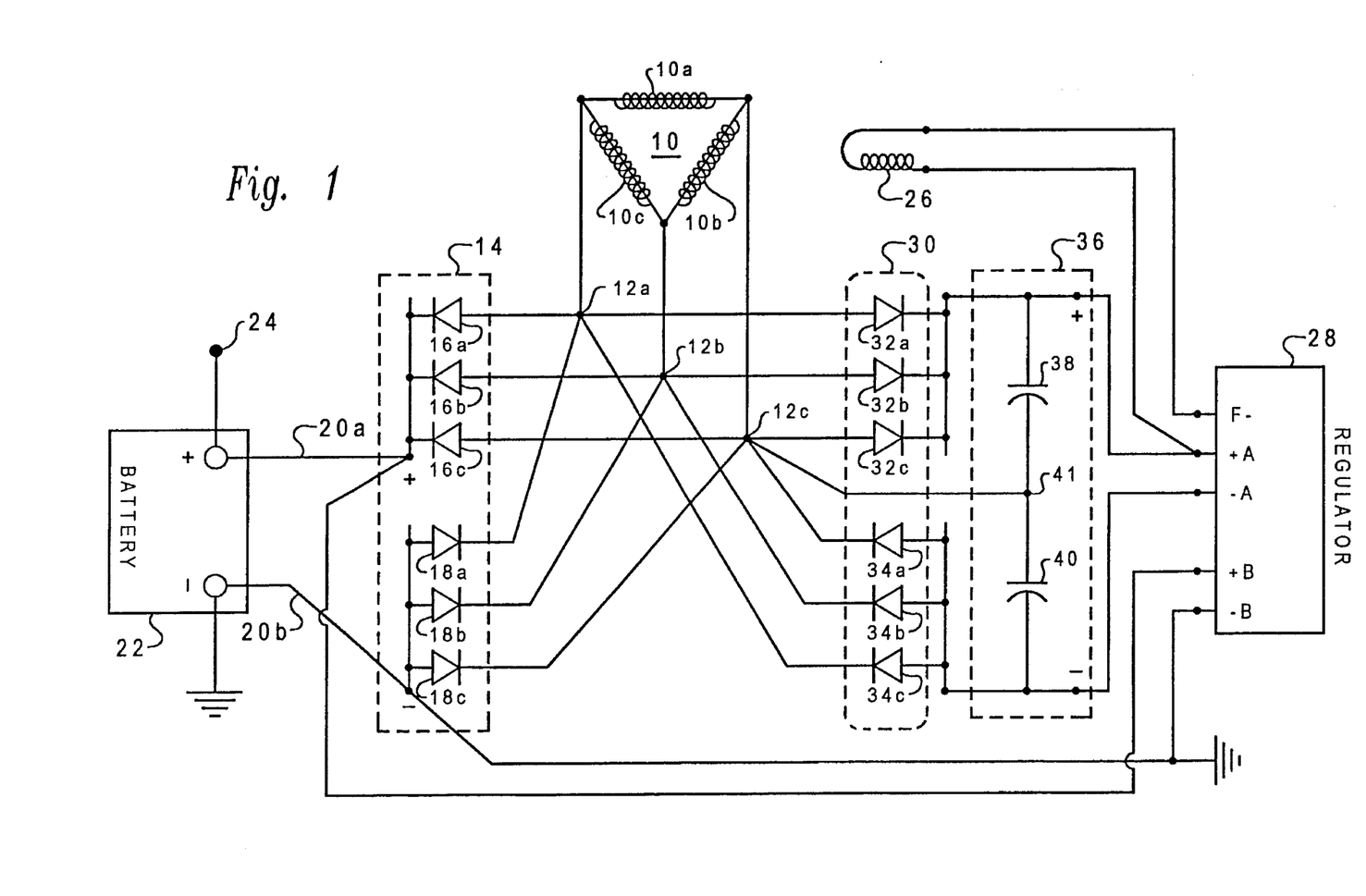
FIG. 1 is a schematic diagram of a high output alternator having two three-phase full-wave bridge rectifiers and a single stage capacitor voltage doubler circuit in accordance with the invention.

Referring now to the Figures, and in particular to FIG. 1, there is depicted a schematic diagram of the high output alternator of the present invention. A three-phase AC generator is comprised of stator windings 10 and field winding 26. Preferably, the generator is of the type where the stator windings 10 are stationary and the field winding 26 is mechanically driven in rotation by a vehicle engine. The generator stator windings 10 are arranged in a delta configuration in which the three coils are connected end to end, and each of these ends are connected to output terminals 12a, 12b, and 12c, respectively. As will be appreciated by those skilled in the art, the line-to-line phase voltage components of the three-phase AC voltage produced by the generator appear between the respective output terminals 12a, 12b, and 12c, each being of different phase with respect to each other. Alternatively, the generator stator windings 10 could be connected in a star configuration to obtain the same AC output voltage.

The alternator output is rectified by a full-wave diode bridge rectifier 14 which comprises at least six diodes. The diode pairs 16 and 18 are connected across each of the output terminals 12a, 12b, and 12c such that an essentially DC voltage is produced across voltage supply rails 20a and 20b, rail 20a being positive with respect to rail 20b. The voltage potential across rails 20a and 20b is the output voltage from the three-phase AC generator and supplies power to battery 22 and any external loads attached to node 24. It will be understood that the external load node 24 may be connected to any number of electrically powered devices. The battery 22 provides stand-by power at a DC voltage of a predetermined low magnitude between its main power terminal and the system ground.

The power provided at the output rails 20a and 20b is directly proportional to the amount of current fed through field winding 26, also known as the rotor coil. Voltage regulator 28 controls the current fed to field winding 26 such that the output voltage on output terminals 20a and 20b is maintained at the predetermined output voltage. In most motor vehicles where a 12V battery 22 is used, the predetermined DC output voltage is commonly set to 14V. Regulator 28 senses output rails 20a and 20b at input terminals B+ and B–. This provides the feedback to which regulator 28 responds. Through its internal circuitry described below, regulator 28 senses the alternator output voltage at input terminals B+ and B–, and decreases or increases the amount of current fed through field windings 26 by regulating the current input at input terminal F depending on whether the sensed output voltage rises above the predetermined output voltage or falls below the predetermined output voltage, respectively. The supply voltage provided to regulator 28 to be regulated down to the required excitation voltage is input at terminals A+ and A−. It should be noted that the alternator circuit as has been described up to this point is common to the preferred embodiment of FIG. 1, the preferred embodiment of FIG. 2, and the preferred embodiment of FIG. 3.

FIG. 1 shows rectifying network 30 as a three-phase full-wave diode bridge containing six diodes. Each of the three diodes 32 are separately connected at their anodes to AC terminals 12a, 12b, and 12c, respectively. The three diodes 34 have their cathodes connected to AC terminals 12a, 12b, and 12c, respectively, such that each diode is connected to only one particular AC terminal.

Voltage multiplier circuit 36 is comprised of two capacitors, capacitor 38 and capacitor 40, connected in series. The positive terminal of capacitor 38 represents the positive pole of voltage multiplier circuit 36. The negative terminal of capacitor 40 represents the negative pole of multiplier circuit 36. The cathodes of diodes 32 are connected to this positive pole, and the anodes of diodes 34 are connected to this negative pole. The common node 41 between series connected capacitors 38 and 40 is connected to stator winding AC output terminal 12c; although, due to the symmetry of the circuit, node 41 may be connected to output terminals 12b or 12a without changing the operation of the circuit. The positive pole output from voltage multiplier 36 is input into the A+ terminal on regulator 28. The negative pole output from voltage multiplier 36 is input into terminal A− on regulator 28.

In operation, rectifying network 30 and voltage multiplier 36 provide an amplified supply voltage to regulator 28 as follows. In cooperation, rectifying network 30 and voltage multiplier 36 create a voltage doubling circuit. This voltage doubling circuit, or capacitor bridge circuit, is powered by the three phase AC output voltage on output terminals 12a, 12b, and 12c. When the rotor carrying the field winding 26 rotates, it causes an AC waveform to be produced in each of the three stator windings 10, with all three waveforms being out of phase with each other by 120 degrees. Each of the three AC waveforms are output on output terminals 12a, 12b, and 12c, respectively.

The voltage multiplier circuit is known in the art and has been used in prior alternators. The operation of the charge pumping voltage multiplier is described in Meier U.S. Pat. No. 4,853,557 and Smith U.S. Pat. No. 4,599,687; although in those patents, the voltage doubler is used to amplify voltage supplied to the loads and not to amplify field voltage. The description below summarizes the operation of the voltage multiplier as applied in the present invention.

The pumping action of the capacitor bridge circuit which generates the doubled voltage will initially be described with reference to the application of only a single phase of the alternator winding, applied across output terminals 12a and 12c. The nominally positive half cycle of the AC waveform in winding 10a charges capacitor 38 via diode 32a to the effective peak voltage potential of the AC waveform with respect to the effective reference terminal 12c, which is connected to the common node 41. As the AC waveform at output terminal 12a begins to fall, capacitor 38 is prevented from discharging back into the stator windings 10 by rectifying diodes 32. On the next negative half cycle in winding 10a, capacitor 40 will be charged via diode 34c to the negative peak voltage of the AC waveform. As the AC waveform begins to rise, diode 34c will block charge from returning back onto capacitor 40. Since capacitors 38 and 40 are in series, the voltage across the series pair will be double the peak voltage of the alternating current waveform in stator winding 10a.

The charge pumping action of the circuit continues with the second phase of the three phase AC output voltage through the action of stator winding 10b. When stator winding 10b has a nominally positive half cycle of the AC waveform applied to output terminal 12b, charge is pumped into capacitor 38 via diode 32b. On the next negative half cycle in stator winding 10b, capacitor 40 will be charged to the negative peak voltage of the AC waveform with respect to node 41 via diode 34b. In this way, stator winding 10a and 10b work in conjunction to pump charge onto capacitors 38 and 40 to produce a DC voltage across the positive and negative poles equal to double the magnitude of the alternator AC output voltage.

With reference to the conjunctive operation of the three phases derived from alternator stator windings 10, the present embodiment utilizes two of those phases for connection to the capacitor-bridge circuit at terminals 12a and 12b, the third phase is used as a reference and is connected directly from output terminal 12c to the common node 41 of the series pair capacitors. An alternative embodiment of the present invention would utilize the alternator circuit of FIG. 1 having a star configured stator winding 10. The center point connecting the three stator windings would be common and the end of each of the three stator windings 10 would be connected to output terminals 12a, 12b, and 12c, respectively. Node 41 would be connected to output terminal 12c, the same as in the Delta configuration. Moreover, another alternative embodiment would insert a half-wave rectifying bridge as the rectifying network 30.

As can be appreciated by the foregoing description, the present invention provides a circuit for amplifying the generator's AC output voltage to supply a voltage at the regulator approximately twice that previously available in high output alternators for exciting the field winding. For example, prior efforts to enhance the output of alternators involved efforts to reduce voltage drops from the 14 volts output from the rectifying network through the regulator to supply the maximum load voltage to the field winding. However, field excitation voltage was always limited by this 14 volts, which in turn limited the output of the alternator itself.

The present invention, as described in FIG. 1, effectively doubles the available voltage to be applied to the field winding, substantially raising the ability of the alternator to output higher currents at output terminals 20a and 20b. Moreover, the voltage multiplier circuit 36 can be redesigned with further stages of voltage doublers to supply even higher levels of DC voltage to regulator 28. Moreover, to implement the present invention only a few diodes and capacitors need be included in the alternator. These components are physically much easier to place within the alternator itself than are additional transformers or additional stator windings as has been taught in the prior art. These components are also much less expensive to acquire, and their small size and circuit connections make them very simple and inexpensive to manufacture.

It will be appreciated by those skilled in the art that the physical form which the present invention takes is clearly unimportant to practicing the invention. The redesigned regulator, voltage multiplier circuit, and rectifying network could each be in separate packages. Alternatively, all three could be combined in the same package. Last, it should be appreciated that these three circuits combine to embody the present invention when utilized with an alternator, and so, they could be packaged together and sold separately from an alternator so that existing alternators could easily be retrofitted to produce the high output alternator of the present invention. This retrofit kit will require replacing the brush assembly on those alternators that use one grounded brush with isolated rotor brushes, since A− does not correspond to system ground.

Figure 2:
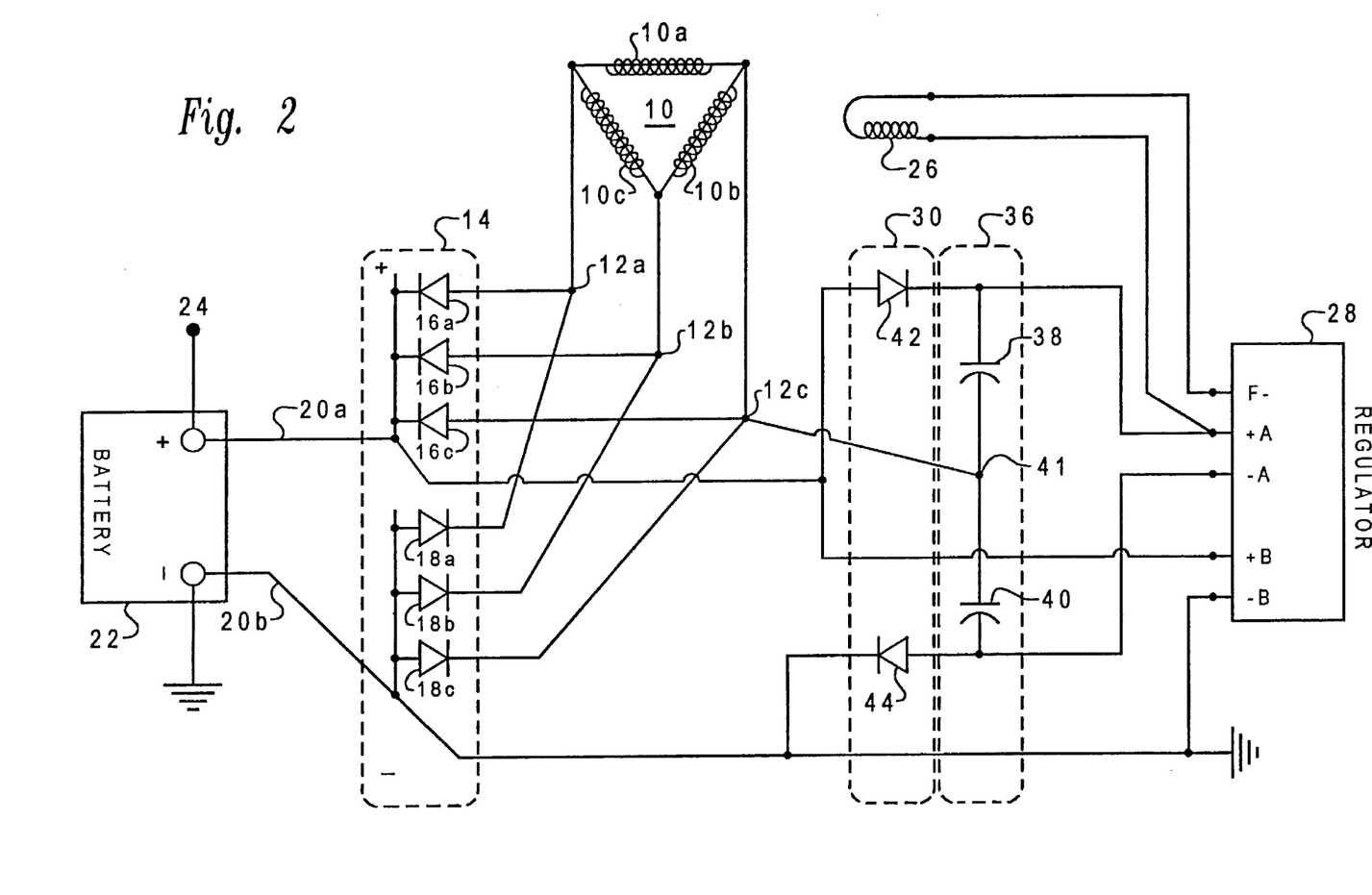
FIG. 2 is a schematic diagram of a high output alternator having a three-phase full-wave bridge rectifier and a single stage capacitor voltage doubler circuit in accordance with the present invention.

Referring now to FIG. 2, there is depicted a schematic diagram of an alternative preferred embodiment of the high output alternator of the present invention. The alternator circuit remains identical to that described for FIG. 1 except in the configuration of rectifying network 30. Rectifying network 30 is comprised of blocking diodes 42 and 44. The anode of blocking diode 42 is connected to the rectified voltage at output terminal 20a, and the cathode of blocking diode 42 is connected to the positive pole of voltage multiplier circuit 36. Blocking diode 44 has its anode connected to the negative pole of voltage multiplier circuit 36 and its cathode connected to the negative output terminal 20b, which in this case is ground. It will be appreciated by those skilled in the art that the anode of blocking diode 42 and the cathode of blocking diode 44 could be tied to output terminal 12a or 12b to create a single phase full-wave rectifying network.

The capacitive bridge pumping action operates just as it did for the preferred embodiment of FIG. 1. As the AC voltage at output terminal 12a rises relative to the AC voltage at output terminal 12c, charge pumped through diode 16a will also pass through blocking diode 42 to the positive terminal of capacitor 38. As the AC voltage begins to drop from its peak value, blocking diode 42 becomes reverse biased and prevents charge from returning from capacitor 38 to battery 22. Similarly, on the nominally negative half cycle of the AC voltage at terminal 12a referenced to 12c, charge will be pumped from the negative terminal of capacitor 40 through blocking diode 44 and through diode 18a. Again, after the negative pole of voltage multiplier 36 reaches the negative peak magnitude of the AC voltage waveform, blocking diode 44 becomes reverse biased and prevents charge from entering into the negative terminal of capacitor 40. Similarly, the second phase on output terminal 12b charges capacitors 38 and 40. The sinusoidal output at 12c pumps the voltages across capacitors 38 and 40, generating a potential equal to twice the DC voltage across output terminals 20a and 20b.

In this way, for the typical motor vehicle, the positive pole is raised to a potential of 14 volts over node 41 and the negative pole attains a potential of negative 14 volts relative to node 41 so that the combined potentials of the positive and negative poles supplies a doubled voltage of approximately 28 volts input into regulator 28. As can be seen, this preferred embodiment contains less components and is slightly easier to wire than the first embodiment. Its lower cost and simplicity makes it ideal as a retrofit circuit for existing alternators. It can be seen that regulator 28 requires isolated rotor brushes. Thus, a retrofit might require replacing both the existing regulator and brush assembly.

Figure 3:
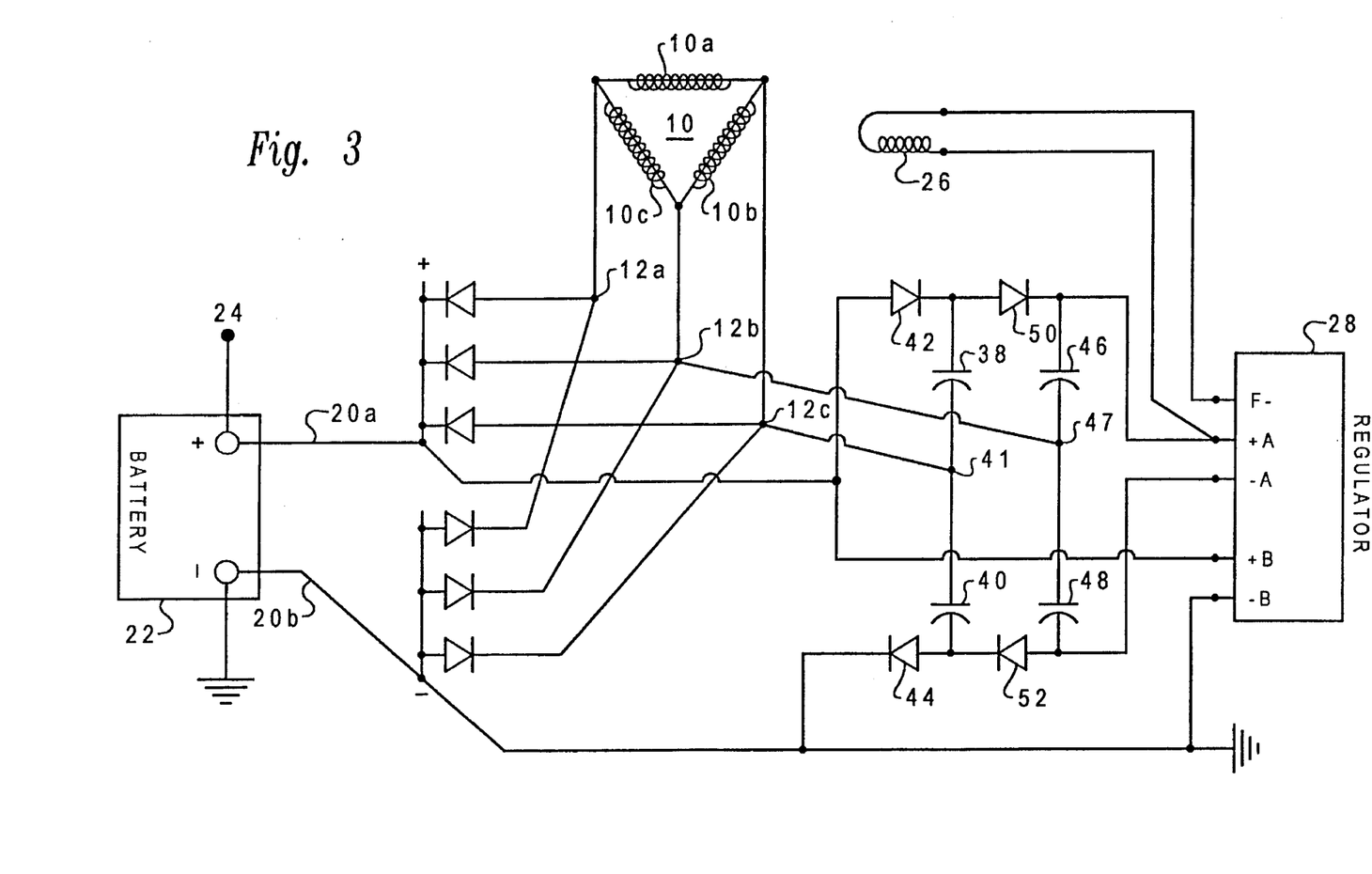
FIG. 3 is a schematic diagram of a high output alternator having a three-phase full-wave bridge rectifier and a two-stage capacitor voltage multiplier circuit in accordance with the invention.

Referring now to FIG. 3, there is depicted a schematic diagram of another preferred embodiment of the present invention. Here, a second stage is included in the voltage doubler of FIG. 2. As described with FIG. 2, capacitors 38 and 40 are charged by the charge pumping mechanism of the single phase AC voltage on output terminal 12a in conjunction with the single phase AC voltage output on output terminal 12b by referencing node 41 with output terminal 12c. In a similar manner, the alternating current waveform on output terminal 12c will charge capacitors 46 and 48. When stator winding 10b has a nominally positive half cycle at output terminal 12c relative to output terminal 12b, which is connected to the common node 47 between capacitors 46 and 48, it charges capacitor 46 via capacitor 38 and blocking diode 50. Capacitor 46 is, at this moment, effectively connected across alternator stator winding 10b and capacitor 38 in series, and it will, therefore, charge up to the sum of the peak voltage of the alternator current AC waveform in stator winding 10b and the voltage across capacitor 38. This results in a voltage across capacitor 46 equal to two times the voltage across capacitor 38. As the voltage drops from the peak value in stator winding 10b, blocking diode 50 prevents the discharge of capacitor 46. In a similar manner, during the negative half cycle of the AC wave form in winding 10b, capacitor 48 is charged to double the voltage applied to capacitor 40 and is prevented from discharge by blocking diode 52.

As can be seen, the circuit of FIG. 3 supplies power to regulator 28 for use as an excitation voltage in field winding 26 at four times the output voltage across output terminals 20a and 20b. In the same way, a fourth preferred embodiment would comprise the configuration of FIG. 3 with an additional voltage doubler stage set in series with the previous two stages and having the common node between the series capacitors tied to output terminal 12a to provide a supply voltage eight times that of the output voltage across output terminals 20a and 20b.

Figure 4:
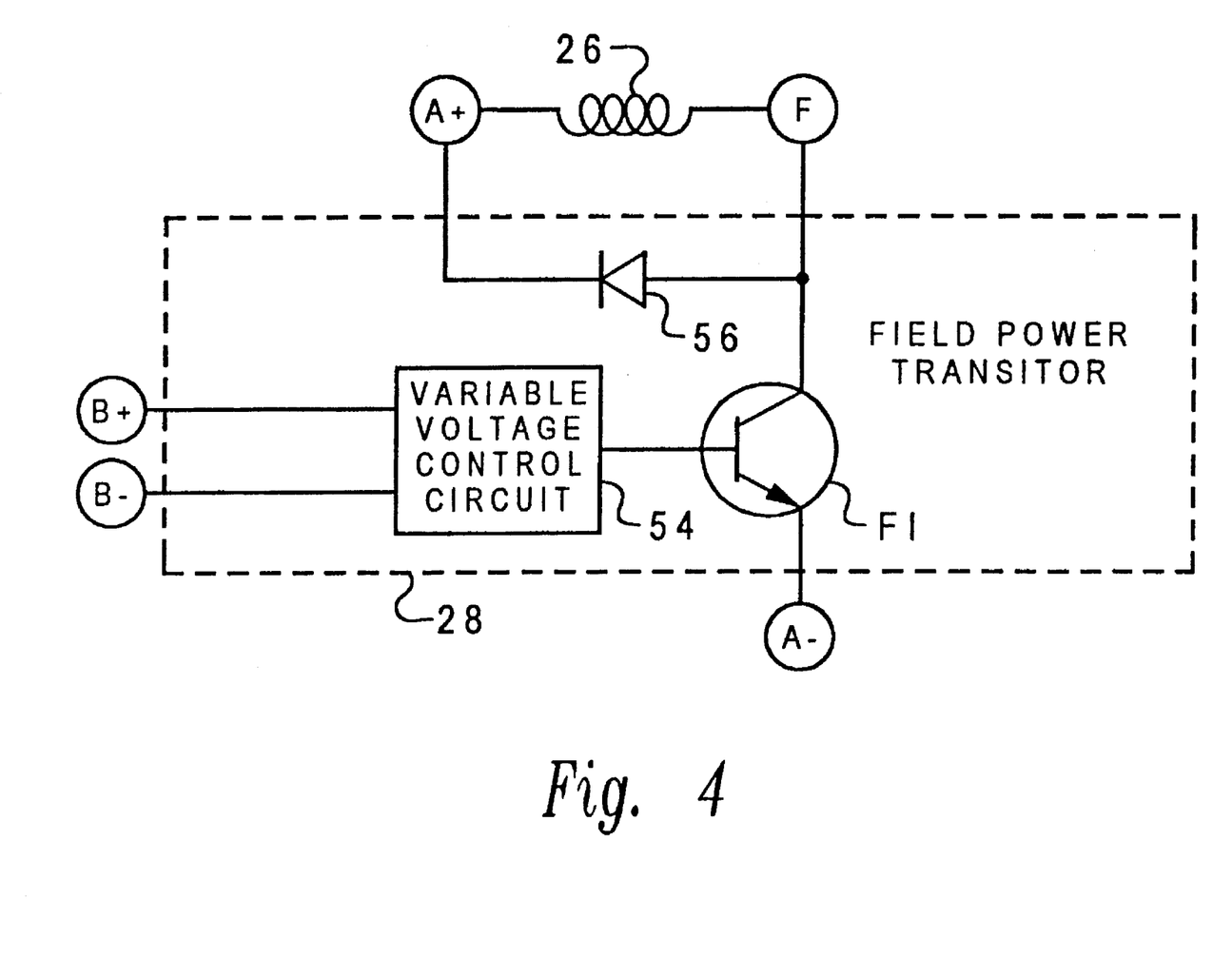
FIG. 4 is a schematic block diagram of a voltage regulator in accordance with the present invention.

Referring now to FIG. 4, there is depicted a schematic block diagram of the regulator of the present invention. The voltage regulator of FIG. 4 regulates the current through field winding 26 in order to control the power output of the alternator. If the load on the generator at load terminal 24 increases, causing a drop in output voltage, that condition is detected by the regulator 28 at input terminals B+ and B−. As can be seen from FIG. 1, terminals B+ and B− are connected in parallel with battery 22 and load output terminal 24. Variable voltage control circuit 54 is designed to increase the voltage applied to field power transistor F1 in response to a drop in the output voltage sensed at terminals B+ and B−. The current through field power transistor F1 increases, thereby increasing the current through field winding 26, and, in response, promoting additional output power from stator windings 10. The voltage applied to field power transistor F1 is increased until the corresponding induced output power from stator windings 10 overcomes the demands of the load at load terminal 24 and allows the measured voltage at terminals B+ and B− to rise above a predetermined voltage, commonly 14 volts. Variable voltage control circuit 54 then begins to reduce the voltage applied to field power transistor F1 to maintain the output voltage applied to input terminals B+ and B− at the predetermined or selected value. In this way, the voltage regulator of FIG. 4 provides a feedback circuit that maintains the output voltage of the alternator at the predetermined DC battery voltage. An alternative design of variable voltage circuit 54 would create an output that pulsed the voltage at the base terminal of transistor F1 at a frequency proportional to the sensed voltage. This pulsed voltage would be used to control the current through field winding 26.

The variable voltage control circuit 54 is well known in the art. There are many ways to design variable voltage control circuit 54 as known in the art of motor vehicle alternator design. One example would be Borg Warner voltage regulator part number R298. Another example would be a Motor Craft voltage regulator part number FOPU-10316-AA. These parts are well known and easily acquired by someone skilled in the art of motor vehicle alternators.

The significant difference between the voltage regulator of the present invention and the prior art is the isolation of the rotor field winding circuit from ground and in the connections to the field winding. One end of field winding 26 is connected directly to the positive power supply at terminal A+. The other end of field winding 26 is connected to the collector of field power transistor F1, and the emitter is connected to the negative power supply at terminal F–. The prior art connected the positive power supply directly, or through a voltage sense resistor, to the field power transistor at its collector, and tied the field winding in series between the emitter and system ground at F–.

The present invention provides "cold wiring" of the field winding by placing the field winding between the positive power supply and the field power transistor F1. By tying field winding 26 directly to the collector of field power transistor F1 which has a larger surface area than the emitter, the voltage drop across field power transistor F1 is slightly smaller than that seen before. The same advantages are seen if field power transistor F1 is a MOSFET transistor. Moreover, separate power terminals are provided to field power transistor F1 to allow an isolated, independent power supply to provide field winding voltage.

Diode 56 is included to shunt current induced by the back-EMF created when the field power transistor F1 cuts off all power to field winding 26. The field power transistor F1 is nominally rated at fifty amps, although a typical current is approximately fifteen amps.

While the invention has been particularly shown and described with reference to a preferred embodiment, it will be understood by those skilled in the art that various changes in form and detail may be made therein without departing from the spirit and scope of the invention.

I claim:

1. In a electrical generating system including a storage battery for providing standby power at a predetermined voltage magnitude between a main power terminal and system ground, a mechanically driven generator having stator windings across which a three-phase AC voltage is produced at an amplitude determined by the amount of current fed through a field winding, and a rectifier for rectifying the three-phase AC voltage to provide a DC battery voltage between a main power terminal and a system ground for charging the battery and supplying other DC voltage loads, the improvement comprising:

a voltage multiplier circuit for multiplying and rectifying the AC voltage to provide a multiplied DC voltage across a positive and a negative pole; and a voltage regulator connected to the voltage multiplier circuit and to the field winding, and being responsive to the DC battery voltage appearing between the main power terminal and system ground, wherein the voltage regulator outputs a voltage at a full or fraction of the magnitude of the multiplied DC voltage to the field winding to control the field current fed through the field winding of the generator to cause the three-phase AC voltage developed across the stator windings of the generator to have an amplitude correct to establish and maintain the DC battery voltage at the predetermined magnitude.

2. An electrical generating system according to claim 1, the voltage multiplier circuit comprising a pair of series-connected capacitors connected across the positive and negative poles, the stator windings having three coils, an end of one of the three stator coils being connected to a common node of the series-connected capacitors.

3. An electrical generating system according to claim 1, the voltage multiplier circuit including a three phase full-wave diode bridge network for rectifying the three-phase AC voltage to provide a DC voltage.

4. An electrical generating system according to claim 1, the voltage multiplier circuit including a single phase full-wave rectifying network connected to an end of one of the three stator coils for rectifying the AC voltage.

5. An electrical generating system according to claim 1, the voltage multiplier circuit comprising a three phase full-wave rectifying network having three input terminals, each terminal being separated by connected to the stator windings.

6. An electrical generating system according to claim 5, wherein the rectifying network is a three phase full-wave diode bridge.

7. An electrical generating system according to claim 1, the voltage multiplier circuit comprising a first pair of series-connected capacitors connected across the positive and negative pole with the common node of the pair connected to one phase of the AC voltage, a first blocking diode with its anode connected to the main power terminal and its cathode connected to the positive pole, and a second blocking diode with its anode connected to the negative pole and its cathode connected to system ground.

8. An electrical generating system according to claim 1, the voltage multiplier circuit comprising:

a first pair of series-connected capacitors having a positive and negative terminal with the common node of the first pair connected to one phase of the three phase AC voltage;

a first blocking diode with its anode connected to the main power terminal and its cathode connected to the positive terminal;

a second blocking diode with its anode connected to the negative terminal and its cathode connected to system ground;

a second pair of series-connected capacitors connected across the positive and negative pole with the common node of the pair connected to a second phase of the three phase AC voltage;

a third blocking diode with its anode connected to the positive terminal and its cathode connected to the positive pole; and a fourth blocking diode with its anode connected to the negative pole and its cathode connected to the negative terminal.

9. An electrical generating system according to claim 1, wherein the voltage multiplier circuit is a voltage doubling circuit.

10. A voltage regulator system for providing a field winding current to an alternator having an AC voltage produced by three stator coils and a primary rectified DC voltage output between a main terminal and a ground terminal for supplying power to a load, comprising:

a rectifying network having a positive and a negative output, and at least two input terminals, the network rectifying and then summing the AC voltage input at the input terminals to produce a DC voltage between the positive and negative outputs;

a voltage multiplier circuit having a pair of series-connected capacitors connected across the positive and negative rectifying network outputs, an end of a first coil of the three stator coils being connected to a common node between the series-connected capacitors; and a regulating circuit being powered by the positive and negative rectifying network outputs, and being responsive to the primary rectified DC voltage for controlling the amount of current fed through the field winding of the generator to cause the amplitude of the AC voltage produced by the generator to be correct to establish and maintain the rectified DC voltage at a predetermined low magnitude, wherein the current fed through the field winding is provided by the voltage multiplier circuit.

11. A voltage regulator system according to claim 10, wherein the rectifying network has three input terminals, each connected to a separate stator coil of a three-phase stator configuration, the network rectifying each phase of voltage and then summing the voltages to create a potential between the positive and negative outputs.

12. A voltage regulator system according to claim 11, wherein the rectifying network is a three phase full-wave diode bridge.

13. A voltage regulator system according to claim 10, wherein the rectifying network is comprised of a first diode having its anode connected to the rectified DC voltage output and its cathode connected to the positive output, and a second diode having its anode connected to the negative output and its cathode connected to the ground terminal.

14. A voltage regulator system according to claim 13, wherein the voltage multiplier circuit includes a second pair of series-connected capacitors having a positive terminal and a negative terminal, an end of a second coil of the three stator coils being connected to the common node between the series-connected capacitors, a third blocking diode with its anode connected to the positive output and its cathode connected to the positive terminal, and a fourth blocking diode with its anode connected to the negative terminal and its cathode connected to the negative output, and further wherein the regulating circuit is powered by the positive and negative terminals.

15. An alternator for a motor vehicle or other mobile or isolated unit that has its power requirements supplied by an engine, comprising:

a three-phase AC generator mechanically driven by the engine and having three alternating current generating coils and a field winding configured for producing a three-phase AC voltage across the generating coils, the three-phase AC voltage having an amplitude determined by an amount of current fed through the field winding;

a first rectifying network producing a DC output voltage between positive and negative output terminals, and having three input terminals connected, respectively, with at least one end of the three generating coils;

a second rectifying network having a positive pole, a negative pole, and three input terminals, each separately connected with one of the three generating coils;

a voltage multiplier circuit having a pair of series-connected capacitors having a common node connected across the positive and negative poles, an end of one of the three stator windings being connected to the common node of the series-connected capacitors; and a voltage regulator connected to the voltage multiplier circuit and responsive to the DC voltage appearing between the positive and negative output terminals to control the amount of current fed through the field winding of the generator to cause the amplitude of the three-phase AC voltage produced by the generator to be correct to establish and maintain the DC output voltage at a predetermined magnitude, wherein the current fed through the field winding is provided by the voltage multiplier circuit.

16. The alternator according to claim 15, wherein the first and second rectifying networks are three phase full-wave bridge diodes.

17. The alternator according to claim 15, wherein the three phase windings are delta connected, the exciter winding being wound on a rotary core.

18. A voltage regulator, comprising:

a rectifying network having positive and negative poles and at least one input terminal connected to a three-phase AC input voltage, the network rectifying the AC input voltage to produce a DC voltage between the positive and negative poles;

a voltage multiplier circuit having a pair of series-connected capacitors connected across the positive and negative poles, a phase of the three phase AC input voltage being connected to a common node between the series-connected capacitors; and an isolated regulating circuit having input terminals connected to the positive and negative poles, and a third terminal suitable for connection to a rotor field winding, wherein the regulating circuit further includes a sensing circuit having two inputs suitable for connection to a battery, and wherein the regulating circuit, in response to a voltage across the sensing circuit inputs, impresses a multiplied voltage, between the third terminal and one of the positive or negative poles, which is suitable for connection to a field winding in a generator.

19. A voltage regulator for applying voltage to a rotor field coil, comprising:

a control circuit with positive and negative battery input terminals and a controlled output;

a third terminal for connection to a positive voltage supply, and suitable for being connected to one end of a rotor field coil;

a fourth terminal suitable for being connected to the rotor field coil; and a field power transistor connected between the fourth terminal and a negative voltage supply fifth terminal, and having a control input connected to the controlled output of the control circuit.

20. A voltage regulator for applying voltage to a rotor field coil as in claim 19, further including a diode having its anode connected to the fourth terminal and its cathode connected to the third terminal.

21. A voltage regulator for applying voltage to a rotor field coil as in claim 19, wherein the control circuit produces a constant voltage at the output terminal proportional to the battery voltage present between the positive and negative battery input terminals.

22. A voltage regulator for applying voltage to a rotor field coil as in claim 19, wherein the control circuit produces a pulsing voltage at the output terminal that pulses at a rate proportional to the battery voltage present between the positive and negative battery input terminals.

23. A voltage regulator for applying voltage to a rotor field coil as in claim 19, wherein the positive voltage supply and the negative voltage supply are a positive pole and a negative pole of a voltage multiplier circuit, respectively.

* * * * *